(12) United States Patent
Goel et al.

(10) Patent No.: US 12,056,043 B2
(45) Date of Patent: Aug. 6, 2024

(54) ARTIFICIAL INTELLIGENCE-BASED AUTONOMOUS CONTINUOUS TESTING PLATFORM

(71) Applicant: Smart Software Testing Solutions, Inc., Dublin, CA (US)

(72) Inventors: Pankaj Goel, Dublin, CA (US); Dimpy Sharma, Haryana (IN)

(73) Assignee: Smart Software Testing Solutions, Inc., Dublin, CA (US)

( * ) Notice: Subject to any disclaimer, the term of this patent is extended or adjusted under 35 U.S.C. 154(b) by 35 days.

(21) Appl. No.: 17/931,032

(22) Filed: Sep. 9, 2022

(65) Prior Publication Data

US 2023/0077510 A1 Mar. 16, 2023

Related U.S. Application Data

(60) Provisional application No. 63/243,557, filed on Sep. 13, 2021.

(51) Int. Cl.
*G06F 11/36* (2006.01)
*G06N 20/00* (2019.01)

(52) U.S. Cl.
CPC ........ *G06F 11/3688* (2013.01); *G06F 11/368* (2013.01); *G06N 20/00* (2019.01)

(58) Field of Classification Search
CPC ............ G06F 11/3668; G06F 11/3672; G06F 11/3684; G06F 11/368; G06N 20/00
See application file for complete search history.

(56) References Cited

U.S. PATENT DOCUMENTS

| 8,924,192 B1 | 12/2014 | Poulin |
| 9,298,864 B2 | 3/2016 | Poulin |
| 9,971,678 B2 | 5/2018 | Poulin |
| 10,353,811 B2 | 7/2019 | Poulin |

(Continued)

OTHER PUBLICATIONS

Congzheng Song, Machine Learning Models that Remember Too Much, Oct. 2017, CCS '17: Proceedings of the 2017 ACM SIGSAC Conference on Computer and Communications Security (Year: 2017).*

(Continued)

*Primary Examiner* — Wei Y Zhen
*Assistant Examiner* — Amir Soltanzadeh
(74) *Attorney, Agent, or Firm* — Ahmann Kloke LLP

(57) ABSTRACT

Obtaining a configuration hook. Obtaining a base configuration of a remote system using the configuration hook. Obtaining a system-specific model associated with the configuration hook and the remote system. Obtaining one or more pre-built test accelerators. Obtaining a deep machine learning model. Generating, based on the base configuration, the system-specific model, the one or more pre-built test accelerators and the deep machine learning model, a custom configuration model. Generating a plurality of user journeys to be autonomously tested. Generating, based on the custom configuration model and the plurality of user journeys to be autonomously tested, a plurality of autonomous test scripts. Autonomously pre-configuring at run-time the plurality of autonomous test scripts. Autonomously executing the plurality of autonomous test scripts. Generating, based on the autonomously executed plurality of autonomous test scripts, one or more autonomous test reports. Presenting the one or more autonomous test reports.

20 Claims, 7 Drawing Sheets

(56) References Cited

U.S. PATENT DOCUMENTS

| | | |
|---|---|---|
| 10,691,579 B2 | 6/2020 | Poulin |
| 11,429,813 B1* | 8/2022 | Aghoram Ravichandran ............. G06N 3/045 |
| 11,899,566 B1* | 2/2024 | Singh ..................... G06N 20/00 |
| 2023/0083724 A1* | 3/2023 | Cella ...................... G06Q 30/06 705/28 |
| 2023/0161567 A1* | 5/2023 | Clement .................. G06N 3/08 717/106 |
| 2023/0418730 A1* | 12/2023 | Kumar ................ G06F 11/3684 |

OTHER PUBLICATIONS

Shohreh Shaghaghian, Customizing Contextualized Language Models for Legal Document Reviews, Dec. 2020, IEEE (Year: 2020).*

* cited by examiner

ARTIFICIAL INTELLIGENCE-BASED AUTONOMOUS CONTINUOUS TESTING PLATFORM

CROSS-REFERENCE TO RELATED APPLICATIONS

The present application claims priority to U.S. Provisional Patent Application No. 63/243,557 filed Sep. 13, 2021 and entitled "ARTIFICIAL INTELLIGENCE-BASED AUTONOMOUS CONTINUOUS TESTING PLATFORM," the contents of which is hereby incorporated by reference herein.

DETAILED DESCRIPTION

Figure 1:
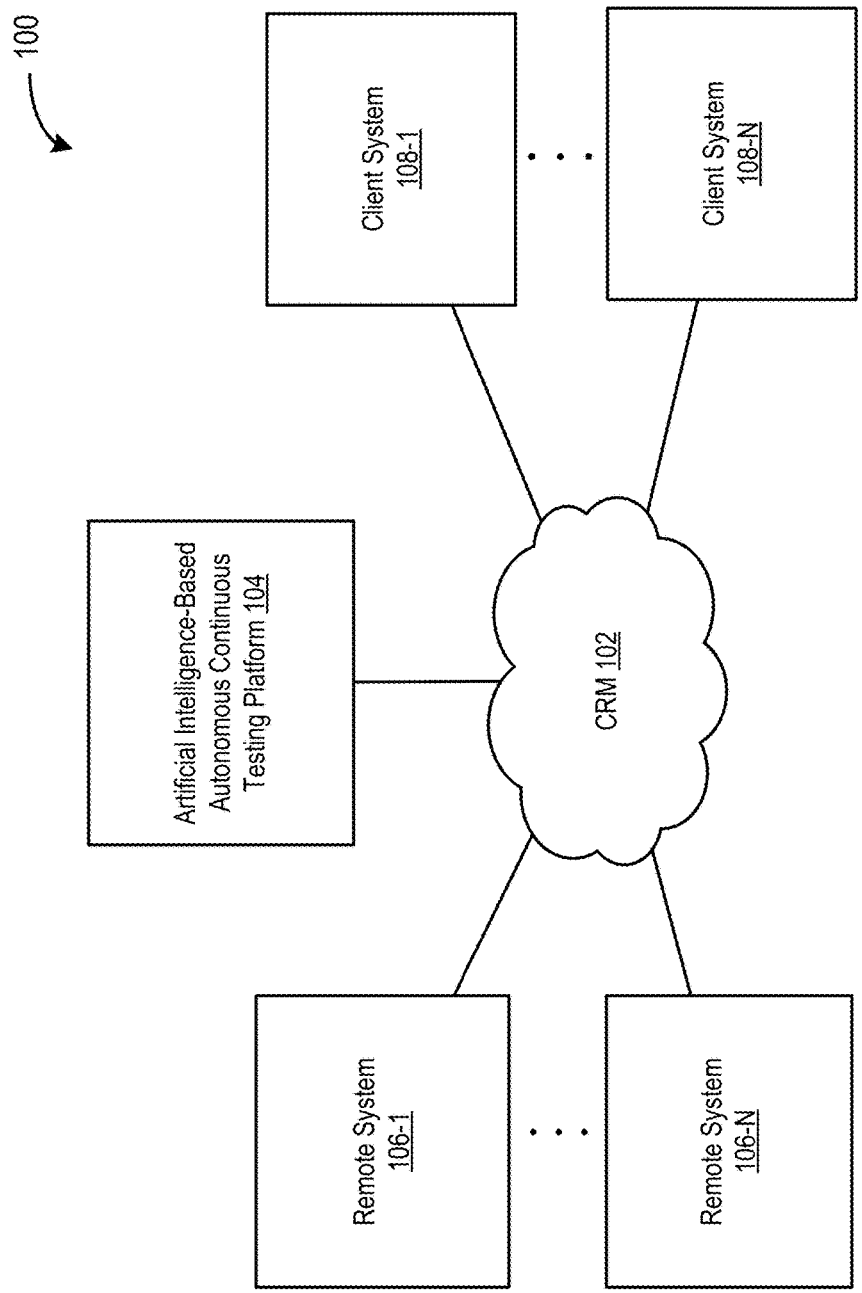
FIG. 1 is a diagram of an example of a system for artificial intelligence-based autonomous continuous testing.

FIG. 1 is a diagram 100 of an example of a system for artificial intelligence-based autonomous continuous testing. The diagram 100 includes a computer-readable medium (CRM) 102, an artificial intelligence-based autonomous continuous testing platform 104 coupled to the CRM 102, remote systems 106-1 to 106-N (individually, the remote system 106, collectively, the remote systems 106) coupled to the CRM 102, and client systems 108-1 to 108-N (individually, the client system 108, collectively, the client systems 108) coupled to the CRM 102.

The CRM 102 in intended to represent a computer system or network of computer systems. A "computer system," as used herein, may include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

Memory of a computer system includes, by way of example but not limitation, random access memory (RAM), such as dynamic RAM (DRAM) and static RAM (SRAM). The memory can be local, remote, or distributed. Non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. During execution of software, some of this data is often written, by a direct memory access process, into memory by way of a bus coupled to non-volatile storage. Non-volatile storage can be local, remote, or distributed, but is optional because systems can be created with all applicable data available in memory.

Software in a computer system is typically stored in non-volatile storage. Indeed, for large programs, it may not even be possible to store the entire program in memory. For software to run, if necessary, it is moved to a computer-readable location appropriate for processing, and for illustrative purposes in this paper, that location is referred to as memory. Even when software is moved to memory for execution, a processor will typically make use of hardware registers to store values associated with the software, and a local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus of a computer system can couple a processor to an interface. Interfaces facilitate the coupling of devices and computer systems. Interfaces can be for input and/or output (I/O) devices, modems, or networks. I/O devices can include, by way of example but not limitation, a keyboard, a mouse or other pointing device, disk drives, printers, a scanner, and other I/O devices, including a display device. Display devices can include, by way of example but not limitation, a cathode ray tube (CRT), liquid crystal display (LCD), or some other applicable known or convenient display device. Modems can include, by way of example but not limitation, an analog modem, an IDSN modem, a cable modem, and other modems. Network interfaces can include, by way of example but not limitation, a token ring interface, a satellite transmission interface (e.g. "direct PC"), or other network interface for coupling a first computer system to a second computer system. An interface can be considered part of a device or computer system.

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes at least two components: 1) a dedicated or shared processor or a portion thereof; 2) hardware, firmware, and/or software modules executed by the processor. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

Assuming a CRM includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

The artificial intelligence-based autonomous continuous testing platform 104 can function to generate and execute test scripts using artificial intelligence and/or machine learning (collectively referred to as either artificial intelligence or machine learning) continuously and autonomously. In a specific implementation, the artificial intelligence-based autonomous continuous testing platform 104 comprises a no-code platform that facilitates implementation of continuous testing autonomously. Functionality of the artificial intelligence-based autonomous continuous testing platform 104 system 104 can be performed by one or more servers (e.g., a cloud-based server) and/or other computing devices.

In a specific implementation, the artificial intelligence-based autonomous continuous testing platform 104 can function to perform configuration mining. Configuration mining is a process in which the artificial intelligence-based autonomous continuous testing platform 104 reads, or otherwise obtains, (e.g., from a remote system 106) a customer's configured data from applications such as SAP, Oracle, Salesforce, and/or the like. The artificial intelligence-based autonomous continuous testing platform 104 can store the extracted configuration in order to generate potential user journeys that can be continuously and autonomously tested by the artificial intelligence-based autonomous continuous testing platform 104.

The remote systems 106 can function to execute application instances, such as Enterprise Resource Planning (ERP) application instances. For example, the remote systems 106 can include Oracle systems, SAP systems, Salesforce systems, business intelligence systems, custom systems, and/or a combination thereof. Accordingly, the executed application instances can include Oracle application instances, SAP application instances, Salesforce application instances, custom application instances, and/or the like. Functionality of the remote systems 106 can be performed by one or more servers (e.g., a cloud-based server) and/or other computing devices. When referring to the remote systems 106 herein, such a reference can refer to the remote system itself (e.g., the server device and/or server software) and/or any applications executing on the remote system 106. Functionality of the remote systems 106 can be performed by one or more servers (e.g., a cloud-based server) and/or other computing devices.

The client systems 108 can function to receive input (e.g., user input), present information (e.g., graphical user interfaces), receive data, transmit data, and/or otherwise communicate with other systems (e.g., over a communication network). For example, the client systems 108 can function to receive and display test reports. Functionality of the client systems 108 can be performed by one or more computing devices and/or servers (e.g., a cloud-based server).

Figure 2:
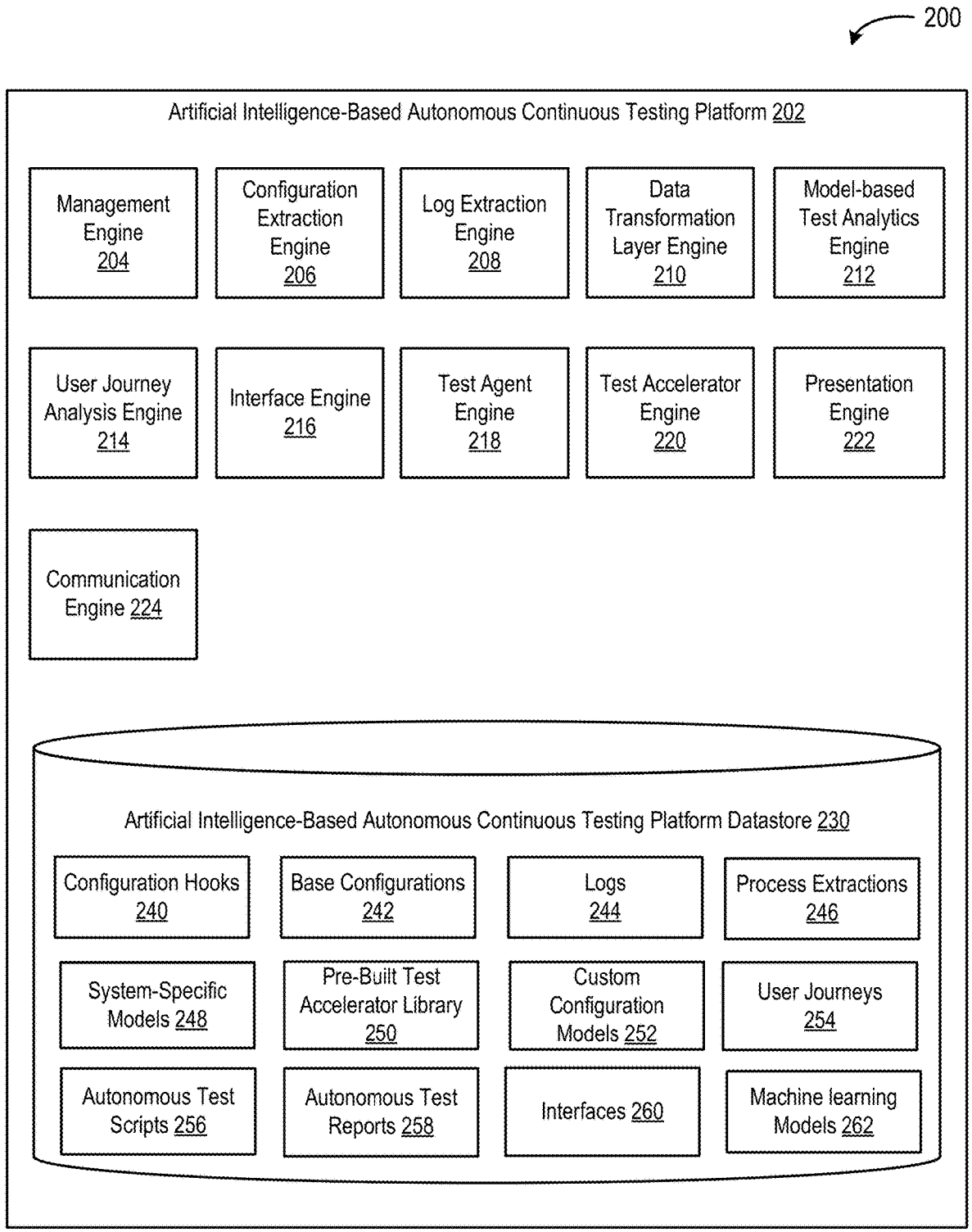
FIG. 2 is a diagram of an example of an artificial intelligence-based autonomous continuous testing platform.

FIG. 2 is a diagram 200 of an example of an artificial intelligence-based autonomous continuous testing platform 202. In the example of FIG. 2, the artificial intelligence-based autonomous continuous testing platform 202 includes a management engine 204, a configuration extraction engine 206, a log extraction engine 208, a data transformation layer engine 210, a model-based test analytics engine 212, a user journey analysis engine 214, an interface engine 216, a test agent engine 218, a test accelerator engine 220, a presentation engine 222, a communication engine 224, and an artificial intelligence-based autonomous continuous testing platform datastore 230.

The management engine 204 is intended to represent an engine that manages (e.g., create, read, update, delete, or otherwise access) configuration hooks 240, base configurations 242, logs 244, process extractions 246, system-specific models 248, pre-built test accelerators 250, custom configuration models 252, user journeys 254, autonomous test scripts 256, autonomous test reports 258, interfaces 260, and/or machine learning models 262. The management engine 204 can store or otherwise manage these elements 240-262 in the artificial intelligence-based autonomous continuous testing platform datastore 230, and/or in one or more other local and/or remote datastores. It will be appreciated that the artificial intelligence-based autonomous continuous testing platform datastore 230 can be a single datastore local to the artificial intelligence-based autonomous continuous testing platform 202 and/or multiple datastores local to the artificial intelligence-based autonomous continuous testing platform 202. In some embodiments, the artificial intelligence-based autonomous continuous testing platform datastore 230 comprises one or more local and/or remote datastores. The management engine 204 can perform any of these operations manually (e.g., by a user interacting with a GUI) and/or automatically (e.g., triggered by one or more of the engines 206-224). Like other engines described herein, some or all the functionality of the management engine 204 can be included in and/or cooperate with one or more other engines (e.g., engines 206-224) and datastores (e.g., artificial intelligence-based autonomous continuous testing platform datastore 230).

The configuration extraction engine 206 is intended to represent an engine that obtains and/or generates configuration hooks 240. As used in this paper, the term obtaining can include identifying, selecting, and/or obtaining (e.g., without requiring user input). Thus, for example, the configuration extraction engine 206 can generate, identify, select, and/or obtain a configuration hook 240 appropriate for a given task. For example, the configuration extraction engine 206 can identify a type of target remote system (e.g., an Oracle system 106) and an interface 260 type (e.g., API, SAP, Oracle, custom) of the target remote system, and then select and obtain a configuration hook 240 based on the type of target remote system, the interface type of the target remote system, and/or one or more other attributes (e.g., type of network connection, amount of anticipated data to receive/transmit, security protocols and/or credentials of the target remote system, and/or the like).

In a specific implementation, the systems and engines described herein can utilize various types of interfaces 260. For example, interfaces 260 can include application programming interfaces (APIs), SAP interfaces, Oracle interfaces, Salesforce interfaces, business intelligence interfaces, custom interfaces, and/or a combination thereof.

In a specific implementation, the configuration extraction engine 206 can function to obtain base configurations 242 of remote systems using configuration hooks 240. For example, the configuration extraction engine 206 can use a particular configuration hook 240 to obtain a base configuration (or configuration information that can be converted to a based configuration) from an Oracle remote system and/or Oracle application over a communication network (e.g., the Internet), and transmit it back to the configuration extraction engine 206. As discussed elsewhere herein, a remote system can refer to hardware and/or software (e.g., a server device and/or one or more hardware and/or software applications executing on the server device).

In a specific implementation, the configuration hooks 240 can include one or more interfaces 260 and artificial intelligence (e.g., machine learning techniques and/or machine learning models 262) to obtain the base configuration of a target remote system (or, simply, remote system). As used herein, artificial intelligence or machine learning can refer to Bayesian techniques and/or models, deep learning techniques and/or models (e.g., artificial neural networks, convolutional neural networks), gap analysis techniques and/or models, supervised learning techniques and/or models, unsupervised learning techniques and/or models, random forest techniques and/or models, and/or the like.

In a specific implementation, the configuration extraction engine 206 can function to generate configuration hooks 240 autonomously (e.g., without requiring user input). For example, the configuration extraction engine 206 can generate configuration hooks 240 based on a template configuration hook 240 according to the type of remote system, the interface type of the remote system, and/or other attributes (e.g., type of network connection, amount of anticipated data to receive/transmit, security protocols and/or credentials of the target remote system, and/or the like).

In a specific implementation, the configuration extraction engine 206 can function to generate and/or obtain system-specific models 248 associated with the configuration hook 240 and the remote system. The system-specific models 248 are specific to the type of remote system. For example, the configuration extraction engine 206 can generate and/or store one or more system-specific models 248 that are specific to an Oracle system, an SAP system, a Salesforce system, a custom system, and so forth. In some embodiments, the configuration extraction engine 206 obtains system-specific models from local (e.g., artificial intelligence-based autonomous continuous testing platform datastore 230 and/or remote datastores.

In a specific implementation, the system-specific models 248 may comprise data models and/or machine learning models. More specifically, the system-specific models 248 can include modeled attributes or parameters of one or more associated remote systems and their application instances, and/or appropriate values for accessing an obtaining data (e.g., configuration information, base configurations 242, logs 244, process extractions 246) from those remote systems and application instances.

In a specific implementation, the configuration extraction engine 206 can function to obtain system-specific models 248 from a library of different system-specific models 248. For example, the library of system-specific models 248 can include a system-specific model 248 for Oracle systems, a system-specific model 248 for SAP systems, a system-specific model 248 for Salesforce systems, and various system-specific models 248 for custom systems. As used herein, a custom system can include systems that are defined on-demand and/or otherwise not process extraction-defined. For example, a remote system that does not conform to Oracle, SAP, or Salesforce can be referred to as a custom system. For custom systems, the configuration extraction engine 206 can generate (e.g., autonomously and/or with user input) system-specific models 248 for the custom systems based on the attributes and/or parameters of the custom system. For example, the modeled attributes and/or parameters can include file types (e.g., CSV, XLS), language formats (e.g., XML), transfer protocols, datastore formats (e.g., relational, flat file, object-oriented), access credentials (e.g., username, passwords, two-factor authentication), and/or the like.

In a specific implementation, the configuration extraction engine 206 can function to identify configuration information of a remote system. For example, the configuration extraction engine 206 can identify configuration information of a remote system using an interface and artificial intelligence (e.g., one or more machine learning models 262) of a configuration hook 240.

In a specific implementation, configuration information can include Oracle configuration files, SAP configuration files, Salesforce configuration files, custom configuration files, and/or the like. For example, the configuration information can include attributes, characteristics, and/or parameters for creating, executing, and/or managing an application instance of an Oracle system, and/or the like.

In a specific implementation, the configuration extraction engine 206 can function to select a subset of configuration information of a remote system based on an interface and artificial intelligence of a configuration hook 240.

In a specific implementation, the configuration extraction engine 206 can function to extract a subset of configuration information of a remote system from the remote system over a communication network. For example, the configuration extraction engine 206 can extract the subset of configuration information of a remote system based on an interface and artificial intelligence of a configuration hook 240. In some embodiments, communication engine 206 converts the subset of the configuration information into a base configuration 242 of a remote system that is stored locally and/or remotely.

In a specific implementation, the configuration extraction engine 206 can function to store (e.g., locally and/or remotely) and/or convert a subset of configuration information to a base configuration 242. The conversion can include, for example, converting the subset of configuration information from a format of the remote system to a format native to the artificial intelligence-based autonomous continuous testing platform 202. In some embodiments, a configuration hook 240 and/or the configuration extraction engine 206 locally stores the base configuration 242 in the artificial intelligence-based autonomous continuous testing platform datastore 230.

In a specific implementation, the configuration extraction engine 206 is designed such that it can behave differently for different systems and applications. For example, the configuration extraction engine 206 can behave (e.g., operate or function) differently for Oracle systems and applications, SAP systems and applications, Salesforce systems and applications, and/or the like. The configuration extraction engine 206 can extract configuration data (e.g., configuration information and/or base configurations) and store the configuration in various formats, such as CSV, XLSX or XML. For example, with a Salesforce system, the configuration extraction engine 206 can interact with the Salesforce system using an API to extract the configuration data. In another example, the configuration extraction engine 206 can extract configuration data from an Oracle system by a combination of BI reports and an API to obtain relevant configuration data. In yet another example, the configuration extraction engine 206 can use an SAP extractor which can connect with an SAP database to obtain (e.g., fetch) the required configuration data.

The log extraction engine 208 is intended to represent an engine that obtain logs 244 from remote systems. In a specific implementation, the logs 244 can include transaction logs, such as ERP transaction logs.

The data transformation layer engine 210 is intended to represent an engine that transforms transaction logs 244. The data transformation layer engine 210 can store the transaction logs 244 in the artificial intelligence-based autonomous continuous testing platform datastore 230 in different formats (e.g., CSV, XLS, and/or the like). In a specific implementation, the data transformation layer engine 210 can process the logs 244 across multiple processes, such as O2C, P2P, R2R, and/or the like, via a process transformation configuration repository and ERP specific XML files/queries which can get refined via artificial intelligence of the data transformation layer engine 210 and can get saved as process extraction output 246 in the artificial intelligence-based autonomous continuous testing platform datastore 230.

The model-based test analytics engine 212 is intended to represent an engine that obtains a deep machine learning model 262 (e.g., artificial neural network model, convolutional neural network model), or other type of machine learning model 262, from a library (e.g., a local library) of machine learning models 262. The local library of machine learning models 262 can include a variety of different types of machine learning models 262 (e.g., Bayesian models, deep learning models, supervised learning models, unsupervised learning models, random forest models, gap analysis models, and/or the like). In some embodiments, the model-based test analytics engine 212 obtains the deep machine learning model from the artificial intelligence-based autonomous continuous testing platform datastore 230.

In a specific implementation, the model-based test analytics engine 212 can function to generate and store custom configuration models 252. In some embodiments, the model-based test analytics engine 212 can generate custom configuration models 252 using base configurations 242, system-specific models 248, pre-built test accelerators 250, and machine learning models 262 (e.g., deep machine learning models 262). For example, the model-based test analytics engine 212 can provide some or all of one or more base configurations 242, one or more system-specific models 248, and one or more pre-built test accelerators 250 as input to one or more machine learning models 262. The model-based test analytics engine 212 can use the output of the one or more machine learning models 262 to generate a custom configuration model 252 by refining and/or retrofitting the one or more system-specific models 248 provided as input, and/or by refining or retrofitting a template model. In a specific implementation, the output of the machine learning model 262 can be the custom configuration model 252 itself.

In a specific implementation, the model-based test analytics engine 212 can function to generate (e.g., autonomously) a plurality of autonomous test scripts 256. For example, the model-based test analytics engine 212 can generate the autonomous test scripts 256 based on one or more custom configuration models 252 and one or more user journeys 254 (discussed further elsewhere herein) to be tested (e.g., autonomously tested). For example, the autonomous test scripts 256 can include code (e.g., autonomously generated code) for testing some or all of the one or more user journeys 254. Although the testing described in this paper is primarily discussed with reference to testing user journeys, it will be appreciated that the systems and methods described can also be applied to testing other types of software and/or hardware.

In a specific implementation, the model-based test analytics engine 212 can function to generate a test coverage index. For example, the model-based test analytics engine 212 can execute a gap analysis that analyzes a gap between industry specific standard test cases and customer specific test cases generated by the model-based test analytics engine 212 and provide a test coverage index based thereon. Additionally, the model-based test analytics engine 212 can also function to generate relevant multiple combinations of test cases with relevant test data combinations.

In a specific implementation, the model-based test analytics engine 212 can function to generate user (e.g., customer) specific test cases along with a gap analysis that can represent a gap between industry standard of test coverage and the user's current state of test coverage. In a specific implementation, the user specific test cases include all of the autonomously created test scripts with multiple relevant test data combinations and test scenarios ready to be executed. These test scripts can be shared with the test agent engine 218 to execute the test scripts.

In a specific implementation, the model-based test analytics engine 212 can function to utilize neural networks and/or other deep learning technology to combine data and generate relevant user journeys (RUJs) that need to be tested autonomously along with their multiple variants and data combinations. The model-based test analytics engine 212 can also utilize artificial intelligence to create a gap analysis and to generate an appropriate test coverage index to showcase or highlight test recommendations and test coverage across multiple customer specific variants.

The user journey analysis engine 214 is intended to represent an engine that generates user journeys 252 (e.g., autonomously and/or based on user input). In a specific implementation, the user journey analysis engine 214 can function to generate user journeys 254 based on one or more custom configuration models 252. For example, user journeys 254 can include walkthroughs, source code, machine code, image data, video data, audio data, and/or the like.

In a specific implementation, the user journey analysis engine 214 can function to generate user journeys based on base configurations 242, pre-built test accelerators 250, system-specific models 248, custom configuration models 252, and/or process extraction output (e.g., output from the data transformation layer engine 210).

In a specific implementation, user journeys 254 can be different for different users (e.g., customers) depending on the application they are using as well as the industry it belongs to. The artificial intelligence-based autonomous continuous testing platform 202 has predefined models (e.g., system-specific models 248) for all different applications, such as SAP, Oracle and Salesforce, along with having deviations according to a company vertical, thus making it behave differently for different applications. In other embodiments, the user journeys 254 are generated by the model-based test analytics engine 214.

The interface engine 216 is intended to represent an engine that can generate and/or otherwise manage interfaces 260. For example, the interface engine 216 can generate and/or manage APIs, SAP interfaces, Oracle interfaces, Salesforce interfaces, business intelligence interfaces, custom interfaces, and/or combination thereof.

In a specific implementation, the interface engine 216 can function to generate interfaces (e.g., autonomously) from template interfaces. For example, a template interface can include one or more field, attributes, and/or parameters that are predefined, and one or more field, attributes, and/or parameters that need to be defined and/or refined. For example, the interface engine 216 can use a template interface to generate an interface (e.g., a specific API) for a custom system (e.g., based on a system-specific model 248 for that custom system). In a specific implementation, the interface engine 216 can modify an existing or predefined interface, such as an Oracle interface, to match the requirements of a custom system (e.g., based on a system-specific model 248 for that custom system).

In a specific implementation, the interface engine 216 can function to cooperate with the user journey analysis engine 214. For example, the interface engine 216 can obtain (e.g., fetch) and convert relevant user journeys 254, its different variants along with data combinations which can be interpreted by the data transformation layer engine 210 by utilizing natural language processing.

The test agent engine 218 is intended to represent an engine that autonomously pre-configures (e.g., at run-time) autonomous test scripts 256. For example, the test agent engine 218 can use run-time data to pre-configure the autonomous test scripts 256 to ensure that the autonomous test scripts 256 are current.

In a specific implementation, the test agent engine 218 can function to autonomously execute autonomous test scripts 256. For example, the test agent engine 218 can autonomously execute autonomous test scripts 256 in response to pre-configuring at run-time any number of autonomous test scripts 256. In a specific implementation, the test agent engine 218 executes the autonomous test scripts 256 to test one or more user journeys 254, although autonomous test scripts 256 can test other types of software and/or hardware.

In a specific implementation, the test agent engine 218 can function to generate one or more autonomous test reports 258. For example, the test agent engine 218 can generate autonomous test reports 258 based on autonomously executed test scripts 256. For example, the autonomous test reports 258 can include some or all the test logs, screenshots and/or other test compliance evidences, and are combined together by the test agent engine 218 for viewing by users in various formats and/or views defined and/or generated by the test agent engine 218.

In a specific implementation, the test agent engine 218 can function to filter autonomous test reports 258. For example, based on user input and/or machine learning, the test agent engine 218 can filter test reports 258 to present a subset of a report to a user.

In a specific implementation, the test agent engine 218 can function to execute tests and interact with application technology layer/UI layer and perform the required actions on the application as per the test case and capture all the logs and the execution data and then converts it into the test reports which can be viewed in different relevant formats by customers. After completion of the test execution, all the test logs and screenshots and other test compliance evidence can be combined together by the test agent engine 212 and can be viewed in multiple reporting formats by customers.

The test accelerator engine 220 is intended to represent an engine that obtains one or more pre-built test accelerators from a library (e.g., local library and/or remote library) of pre-built test accelerators 250. In some embodiments, the test accelerator engine 220 obtains the one or more pre-built test accelerators 250 from a local library of pre-built test accelerators stored in the artificial intelligence-based autonomous continuous testing platform datastore 230.

In a specific implementation, the pre-built test accelerators 250 include industry specific standard test scripts in collaboration with their different possible data models. Generally, the pre-built test accelerators 250 facilitate automation of recurring test operations and facilitate test scrip generation and/or execution. The pre-built test accelerators 250 can include thousands of manually and/or autonomously defined test scripts (e.g., autonomous test scripts 256) based on historical, current, predicted, and/or anticipated customer-specific or system-specific requirements. In one example, a pre-built test accelerator 250 can limit a number of paths covered by a test script, thereby reducing a time to execute the test script.

The presentation engine 222 is intended to represent an engine that presents visual, audio, and/or haptic information. In some embodiments, the presentation engine 222 generates graphical user interface components (e.g., server-side graphical user interface components) that can be rendered as complete graphical user interfaces on client systems (e.g., client systems 108). For example, the presentation engine 222 can function to present autonomous test reports 258 to a user via a dashboard generated at least partially by the presentation engine 222.

The communication engine 224 is intended to represent an engine that sends requests, transmits and receives communications, and/or otherwise provides communication with one or more of the systems, engines, devices and/or datastores described herein. In a specific implementation, the communication engine 224 can function to encrypt and decrypt communications. The communication engine 224 can function to send requests to and receive data from one or more systems through a network or a portion of a network (e.g., CRM 102). In a specific implementation, the communication engine 224 can send requests and receive data through a connection, all or a portion of which can be a wireless connection. The communication engine 224 can request and receive messages, and/or other communications from associated systems and/or engines. Communications can be stored in the artificial intelligence-based autonomous continuous testing platform datastore 230.

Figure 3:
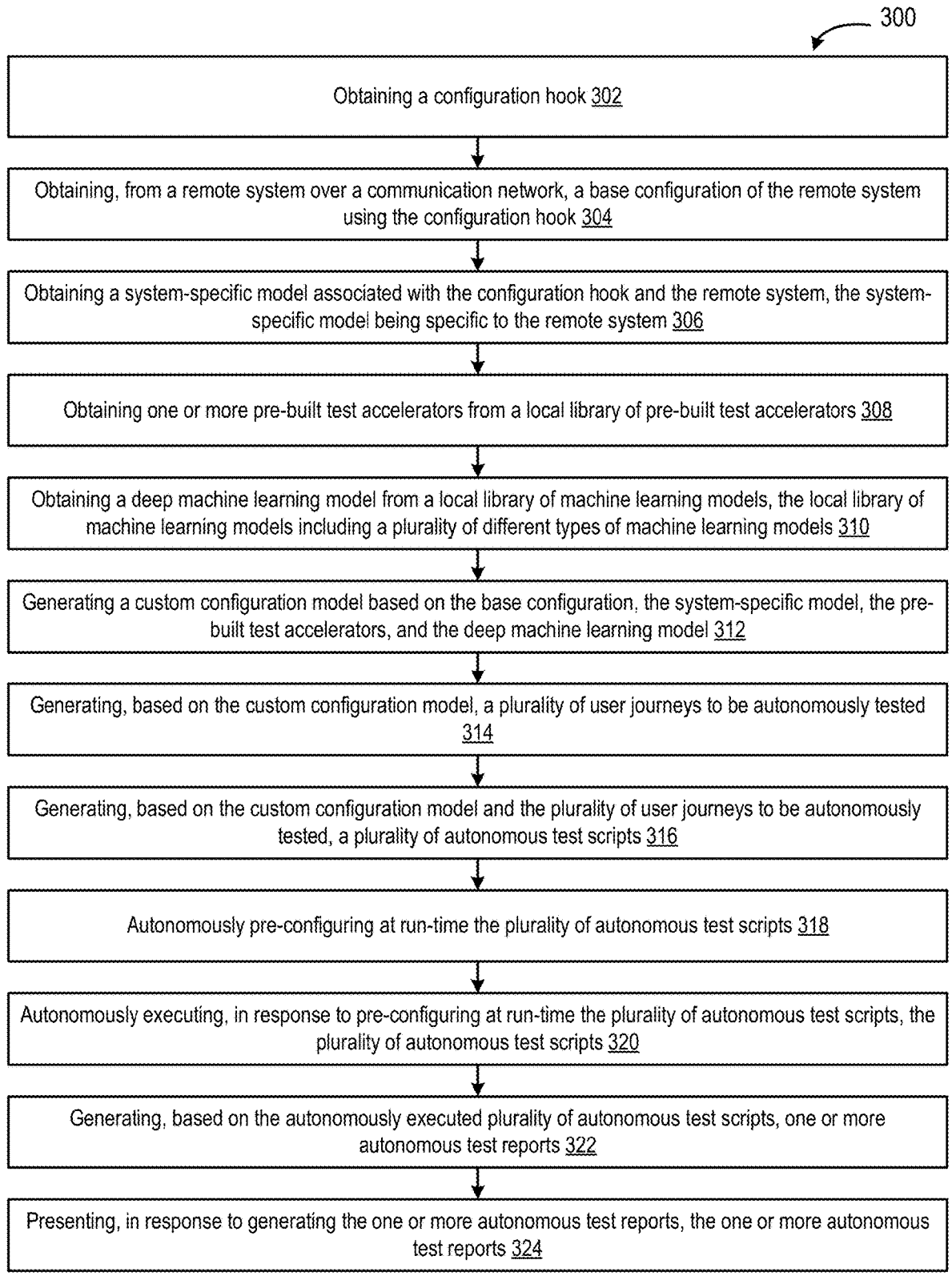
FIG. 3 is a flowchart of an example of a method of artificial intelligence-based autonomous continuous testing.

FIG. 3 is a flowchart 300 of an example of method of artificial intelligence-based autonomous continuous testing. In this and other flowcharts, flow diagrams, and/or sequence diagrams, the flowchart illustrates by way of example a sequence of modules. It should be understood the modules may be reorganized for parallel execution, or reordered, as applicable. Moreover, some modules that could have been included may have been removed to avoid providing too much information for the sake of clarity and some modules that were included could be removed, but may have been included for the sake of illustrative clarity.

In module 302, an artificial intelligence-based autonomous continuous testing platform obtains a configuration hook. As used in this paper, the term obtaining can include identifying, selecting, and/or obtaining (e.g., without requiring user input). Thus, for example, in step 302, the artificial intelligence-based autonomous continuous testing platform can identify, select, and/or obtain a configuration hook appropriate for a given task. For example, the artificial intelligence-based autonomous continuous testing platform 302 can identify a type a target remote system (e.g., an Oracle system) and an interface type of the target remote system (e.g., API, custom), and then select and obtain a configuration hook based on the type of target remote system, the interface type of the target remote system, and/or one or more other attributes (e.g., type of network connection, amount of anticipated data to receive/transmit, security protocols and/or credentials of the target remote system, and/or the like).

In one example, the configuration hook comprises an interface (e.g., application programming interface (API), SAP interface, Salesforce interface, and/or custom interface) and artificial intelligence to obtain the base configuration of a target remote system (or, simply, a remote system). In some embodiments, artificial intelligence-based autonomous continuous testing platform generates the configuration hook (e.g., without requiring user input). For example, the artificial intelligence-based autonomous continuous testing platform can generate the configuration hook based on a template configuration hook according to type of remote system, the interface type of the remote, and/or other attributes.

In some embodiments, a configuration extraction engine of the artificial intelligence-based autonomous continuous testing platform obtains and/or generates the configuration hook.

In module 304, the artificial intelligence-based autonomous continuous testing platform obtains from a remote system over a communication network, a base configuration of the remote system using the configuration hook. For example, the remote system can be an Oracle system, and the configuration hook can hook into the Oracle system, or one or more applications of the Oracle system (e.g., an Oracle application), to obtain configuration information of the remote system and transmit it back to the artificial intelligence-based autonomous continuous testing platform. As used herein, a remote system can refer to hardware and/or software (e.g., a server device and/or one or more applications executing on the server device).

In some embodiments, the configuration extraction engine obtains the base configuration using the configuration hook.

In module 306, the artificial intelligence-based autonomous continuous testing platform obtains a system-specific model associated with the configuration hook and the remote system. The system-specific model is specific to the remote system. For example, the artificial intelligence-based autonomous continuous testing platform can store one or more system-specific models that are specific to an Oracle system, one or more system-specific models that are specific to an SAP system, and so forth. In some embodiments, the artificial intelligence-based autonomous continuous testing platform selects the system-specific model from a plurality of different system-specific models stored locally in an artificial intelligence-based autonomous continuous testing platform datastore.

In some embodiments, the configuration extraction engine obtains the system-specific model from an artificial intelligence-based autonomous continuous testing platform datastore.

In module 308, the artificial intelligence-based autonomous continuous testing platform obtains one or more pre-built test accelerators from a local library of pre-built test accelerators. In some embodiments, a test accelerator engine obtains the one or more pre-built test accelerators from a local library of pre-built test accelerators stored in the artificial intelligence-based autonomous continuous testing platform datastore.

In module 310, the artificial intelligence-based autonomous continuous testing platform obtains a deep machine learning model (e.g., artificial neural network model, convolutional neural network model), from a local library of machine learning models, the local library of machine learning models including a plurality of different types of machine learning models (e.g., Bayesian models, deep learning models, supervised learning models, unsupervised learning models, random forest models, gap analysis model, and/or the like). In some embodiments, a model-based test analytics engine obtains the deep machine learning model.

In module 312, the artificial intelligence-based autonomous continuous testing platform generates a custom configuration model based on the base configuration obtained using the configuration hook, the system-specific model associated with the configuration hook and the remote system, the one or more pre-built test accelerators obtained from the local library of pre-built test accelerators, and the deep machine learning model obtained from the local library of machine learning models including a plurality of different types of machine learning models. For example, some or all of the base configuration, the system-specific model, and the one or more pre-built test accelerators can be provided as input to the deep machine learning model. The output of deep machine learning model can be used by the artificial intelligence-based autonomous continuous testing platform to generate the custom configuration model (e.g., by refining or retrofitting the system-specific model using the deep machine learning model, and/or by refining or retrofitting a template model using the deep machine learning model), and/or the custom configuration model itself.

In some embodiments, the model-based test analytics engine generates the custom configuration model.

In module 314, the artificial intelligence-based autonomous continuous testing platform generates, based on the custom configuration model, a plurality of user journeys to be autonomously tested. For example, user journeys can include walkthroughs, source code, machine code, image data, video data, audio data, and/or the like. In some embodiments, a user journey analysis engine generates the user journeys.

In module 316, the artificial intelligence-based autonomous continuous testing platform generates, based on the custom configuration model and the plurality of user journeys to be autonomously tested, a plurality of autonomous test scripts. In some embodiments, the model-based test analytics engine generates the plurality of autonomous test scripts.

In module 318, the artificial intelligence-based autonomous continuous testing platform autonomously pre-configures at run-time the plurality of autonomous test scripts. In some embodiments, a test agent engine autonomously pre-configures at run-time the plurality of autonomous test scripts.

In module 320, the artificial intelligence-based autonomous continuous testing platform autonomously executes, in response to pre-configuring at run-time the plurality of autonomous test scripts, the plurality of autonomous test scripts. In some embodiments, the test agent engine autonomously executes the autonomous test scripts.

In module 322, the artificial intelligence-based autonomous continuous testing platform generates, based on the autonomously executed plurality of autonomous test scripts, one or more autonomous test reports. In some embodiments, the test agent engine generates the one or more autonomous test reports.

In module 324, the artificial intelligence-based autonomous continuous testing platform presenting, in response to generating the one or more autonomous test reports based on the autonomously executed plurality of autonomous test scripts, the one or more autonomous test reports. In some embodiments, a presentation engine presents the autonomous test reports.

Figure 4:
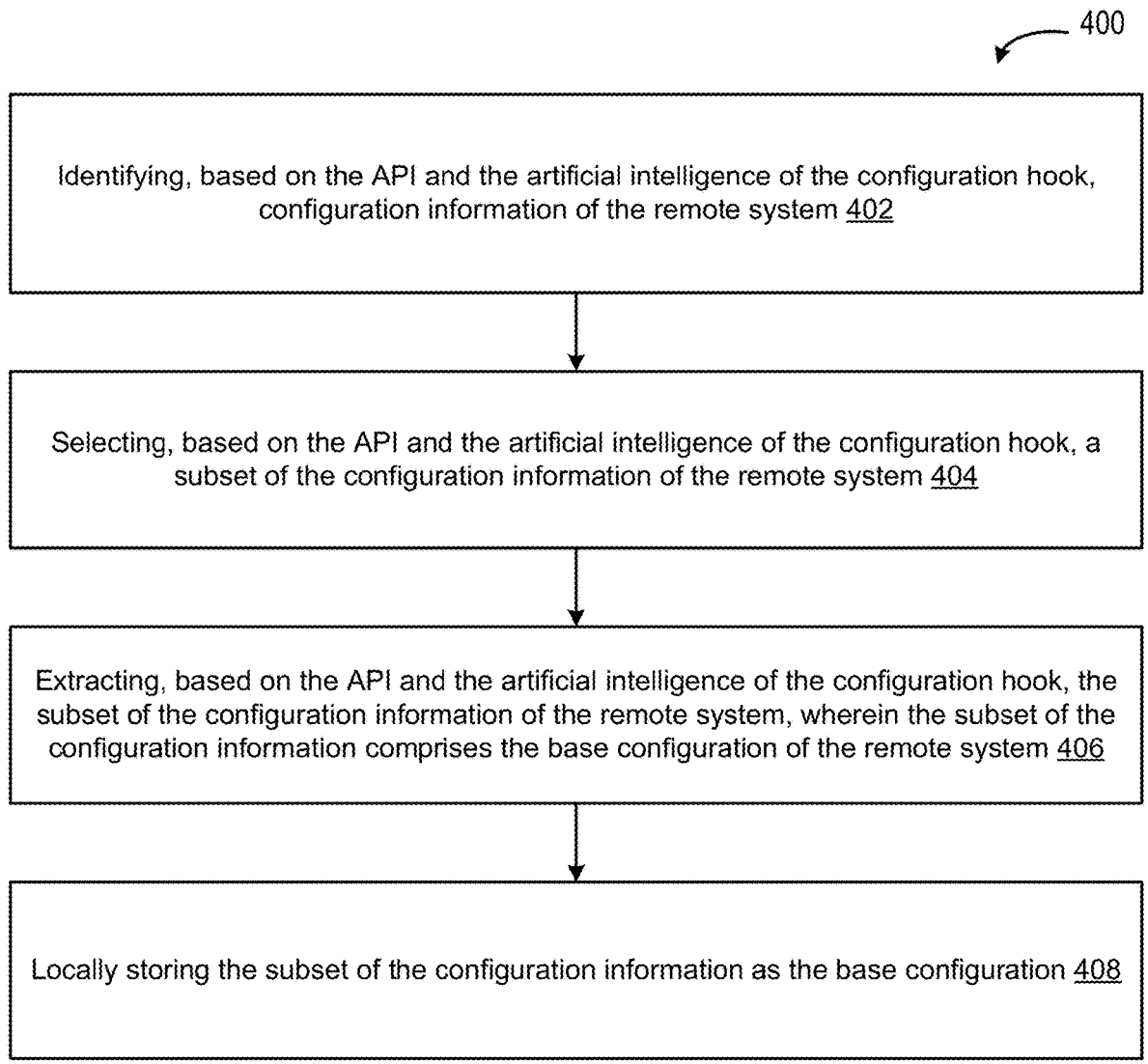
FIG. 4 is a flowchart of an example of a method of obtaining a base configuration using an artificial intelligence-based configuration hook.

FIG. 4 is a flowchart 400 of an example of a method of obtaining a base configuration using an artificial intelligence-based configuration hook. In this and other flowcharts, flow diagrams, and/or sequence diagrams, the flowchart illustrates by way of example a sequence of modules. It should be understood the modules may be reorganized for parallel execution, or reordered, as applicable. Moreover, some modules that could have been included may have been removed to avoid providing too much information for the sake of clarity and some modules that were included could be removed, but may have been included for the sake of illustrative clarity.

In module 402, an artificial intelligence-based autonomous continuous testing platform identifies, based on the API and the artificial intelligence of the configuration hook, configuration information of the remote system. Although an API is described here, other embodiments may use another interface (e.g., any of the other interfaces described herein, such as an SAP interface or a custom interface). In some embodiments, the configuration hook is generated by a configuration extraction engine. In some embodiments, the configuration hook, and/or the configuration extraction engine via the configuration hook, identifies the configuration information (or configuration data).

In module 404, the artificial intelligence-based autonomous continuous testing platform selects, based on the API and the artificial intelligence of the configuration hook, a subset of the configuration information of the remote system. In some embodiments, the configuration hook, and/or the configuration extraction engine via the configuration hook, selects the configuration information.

In module 406, the artificial intelligence-based autonomous continuous testing platform extracts, based on the API and the artificial intelligence of the configuration hook, the subset of the configuration information of the remote system, wherein the subset of the configuration information comprises the base configuration of the remote system. In some embodiments, the configuration hook, and/or the configuration extraction engine via the configuration hook, extracts the subset of the configuration information.

In module 408, the artificial intelligence-based autonomous continuous testing platform locally stores the subset of the configuration information as the base configuration. In some embodiments, the configuration hook and/or the configuration extraction engine locally stores (e.g., in an artificial intelligence-based autonomous continuous testing platform datastore) the subset of the configuration information as the base configuration.

Figure 5:
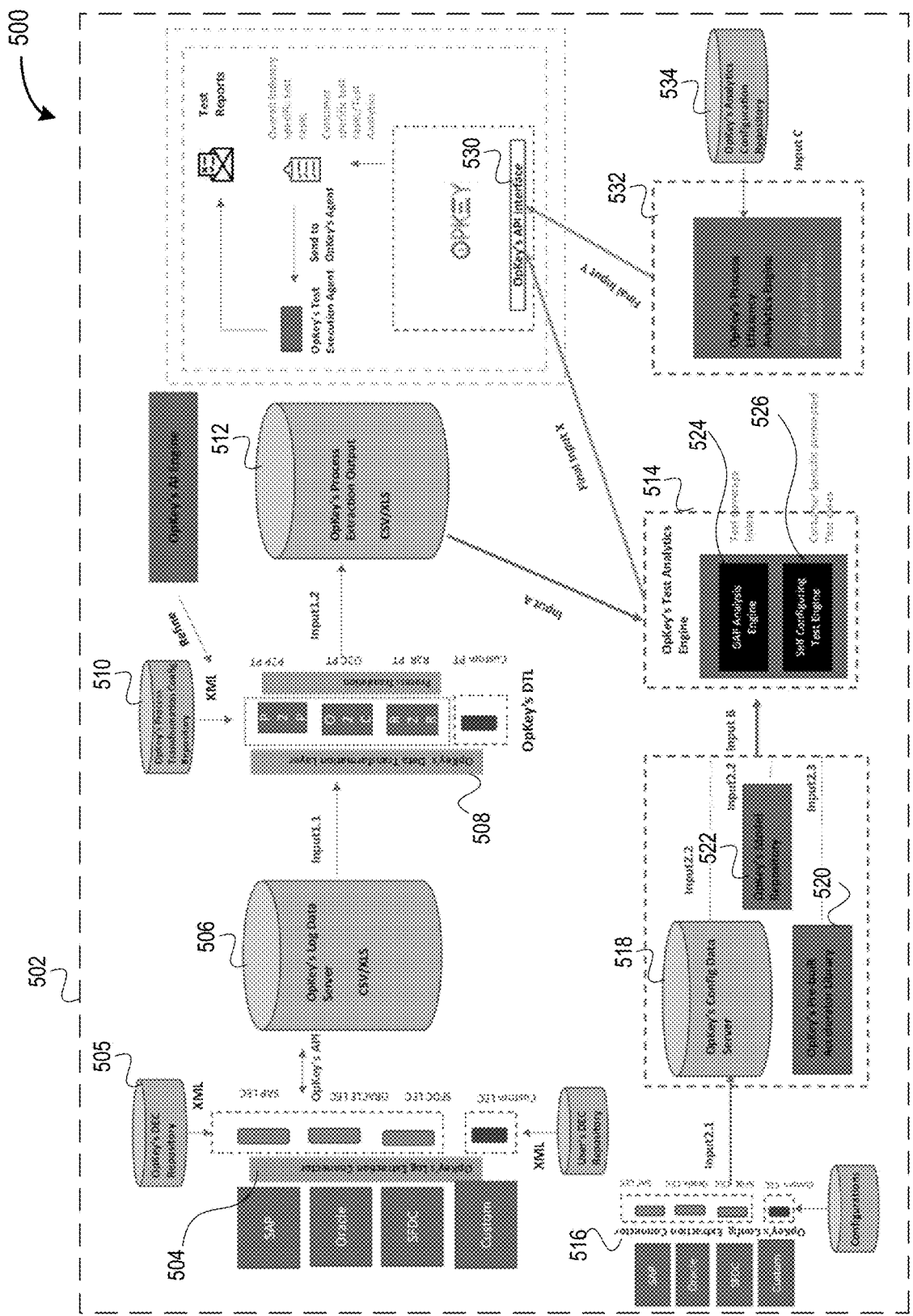
FIG. 5 is a diagram of an example of an artificial intelligence-based autonomous continuous testing platform.

FIG. 5 is a diagram 500 of an example of an artificial intelligence-based autonomous continuous testing platform 502. It will be appreciated that the artificial intelligence-based autonomous continuous testing platform 502 described with reference to FIG. 5 can also include some or all of the functionality of the artificial intelligence-based autonomous continuous testing platform described in reference to other figures herein (e.g., FIGS. 1-4 and 6-7). Similarly, the artificial intelligence-based autonomous continuous testing platform described in other figures (e.g., FIGS. 1-4 and 6-7) can include some or all of the features described with reference to FIG. 5.

Generally, the artificial intelligence-based autonomous continuous testing platform 502 includes functionality for autonomous test mining with autonomous configuration for local SAP, Oracle, and Salesforce test accelerators to gather all process logs together in real-time. The artificial intelligence-based autonomous continuous testing platform 502 can create thousands of autonomous tests in minutes with its transaction logs and configuration mining technology to highlight deviations and recommendations from optimal tests with gap analysis performed by the artificial intelligence-based autonomous continuous testing platform 502.

In a specific implementation, more specifically, the artificial intelligence-based autonomous continuous testing platform 502 can include six primary components and/or features. Firstly, is the log extraction connector 504 (or log extraction engine). The log extraction connector 504 can obtain the data extracted through an XML file/query from a data extraction connector repository 505 of the artificial intelligence-based autonomous continuous testing platform 502, and connects through separate ERP specific "LEC's," such as SAP LEC/SFDC LEC/Custom LEC, and extracts the ERP transaction logs.

Secondly, is the log data server 506. The transaction logs can be saved/stored in the log data server 506 in different formats (e.g., CSV, XLS, and/or the like). Furthermore this input 1.1 can be sent to a data transformation layer 508 where this data can be processed across multiple processes, such as O2C, P2P, R2R, and/or the like, via a process transformation configuration repository 510 via ERP specific XML files/queries which can get refined via artificial intelligence of the artificial intelligence-based autonomous continuous testing platform 502 and can get saved as input 1.2 in the process extraction output 512 which generates input A that can be provided to a test analytics engine (or model-based test analytics engine) 514.

Thirdly, as in the first and second components/features above, the ERP transaction logs can be processed by configuration extractor connector hooks into configurations that have been done in any SAP, Oracle, and/or Salesforce instances via SAP, Oracle, and/or custom configuration extraction connectors 516 (CECs) and extracts the customer specific configurations. Input 2.1 can be generated as input from this layer which can get stored to configuration data server 518.

Fourthly, there can be three inputs, namely, configurations from the configuration data server 518 (Input 2.1), pre-built accelerator library 520 (input 2.2) and a model repository 522 (input 2.3) which can create customer-specific, and their industry-specific models and user journeys based on configurations—the artificial intelligence-based autonomous continuous testing platform 502 can combine the inputs to generate input B that can be provided to the test analytics engine 514.

In a specific implementation, the model repository 522 can maintain customer specific models (e.g., system-specific models) based on relevant configurations/data extracted from the ERP systems and can be ready to create all the possible test scenario combinations using these artifacts. The data extracted from the CEC can be analyzed (e.g., by the model repository 522). The model repository 522, or other component of artificial intelligence-based autonomous continuous testing platform 502, can use machine learning to retrofit and/or refine existing models as per the extracted configurations and further send to other components of the artificial intelligence-based autonomous continuous testing platform 502 (e.g., test analytics engine 514).

Fifthly, input A and input B can be provided to the test analytics engine 514 where a gap analysis engine 524 of the test analytics engine 514 can analyze one or more gaps between industry specific standard test cases and customer specific test cases generated and provide a test coverage index based thereon. Additionally, a self-configuring test engine 526 of the test analytics engine 514 can generate relevant multiple combinations of test cases with relevant test data combinations. Together the test analytics engine 514 can generate a final input X that it can provide to an API interface 530.

Sixthly, a process efficiency analytics engine 532 can receive input C from an analytics configuration repository 534 which can be the benchmarking analytics of different ideal analytics across different processes and ERP's and feeds the process efficiency analytics engine 532 which can generate a process improvement index for customers in the form of analytics, which can be the final input Y that is provided to the API interface 530.

In a specific implementation, the process efficiency analytics engine 532 can use input from the analytics configuration repository 534 that stores benchmarking analytics and standard test analytics index across multiple industries and business processes. In a specific implementation, the process efficiency analytics engine 532 creates a process improvement index and multiple efficiency improvement analytics to showcase and/or otherwise highlight.

Figure 6:
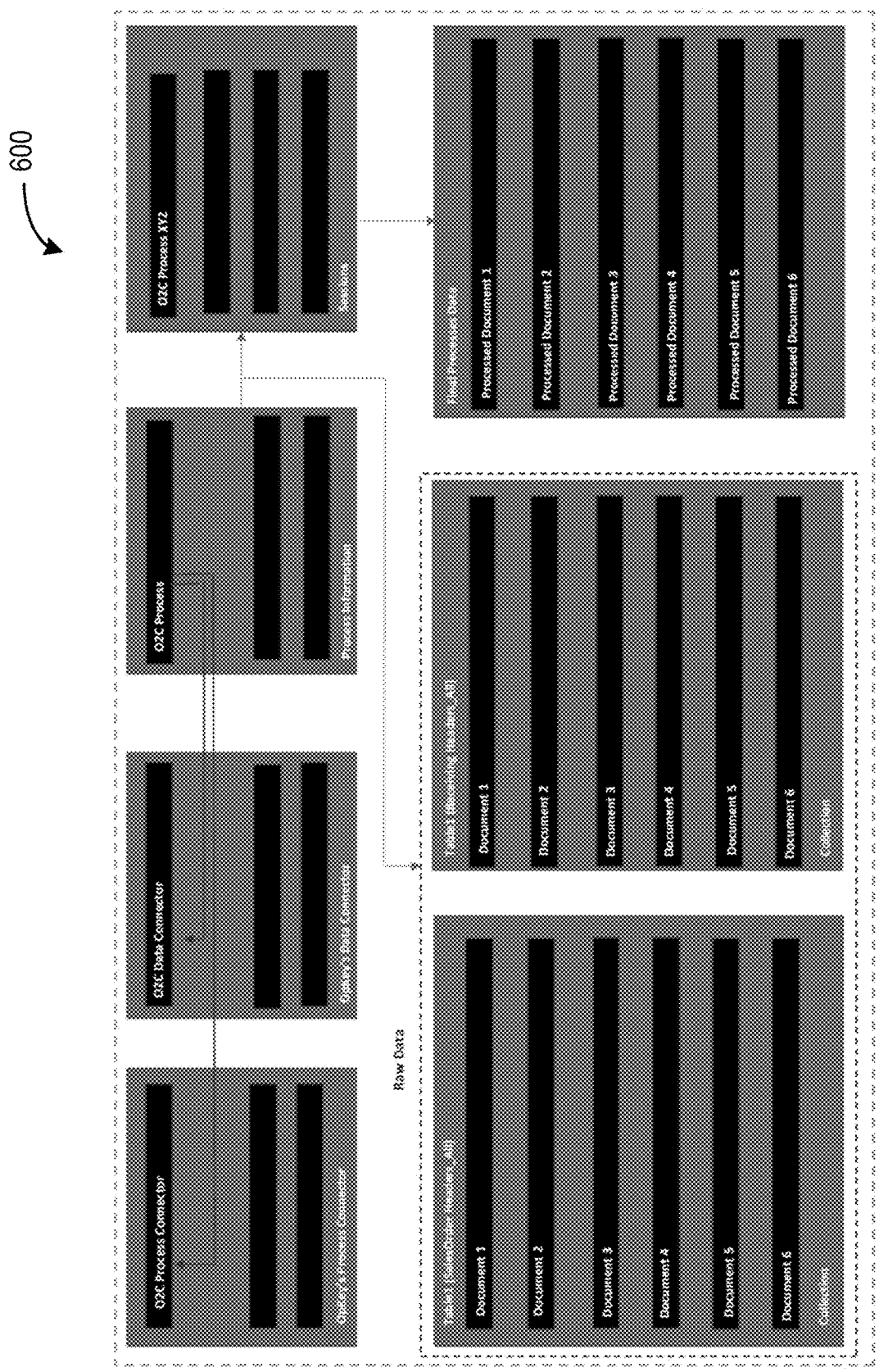
FIG. 6 is a diagram of an example structure of a database of an example artificial intelligence-based autonomous continuous testing platform.

An example database structure used by the artificial intelligence-based autonomous continuous testing platform 502 is shown in FIG. 6.

Figure 7:
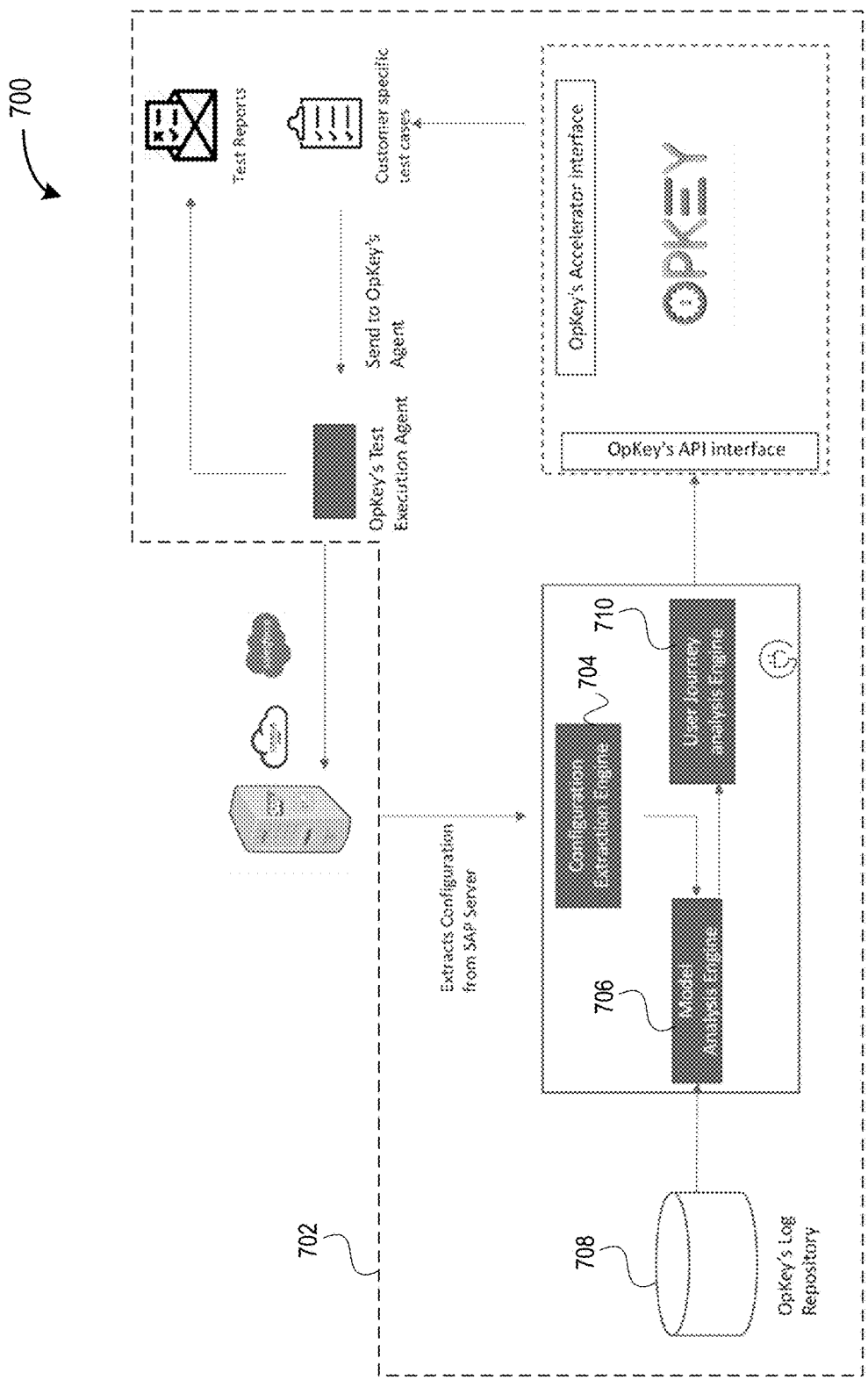
FIG. 7 is a diagram of an example of a system for artificial intelligence-based autonomous continuous testing.

FIG. 7 is a diagram 700 of an example of a system for artificial intelligence-based autonomous continuous testing. It will be appreciated that the features described with reference to FIG. 7 can also include some or all of the functionality of artificial intelligence-based autonomous continuous testing platforms described in reference to other figures herein (e.g., FIGS. 1-5 and 6). Similarly, the artificial intelligence-based autonomous continuous testing platforms described in other figures (e.g., FIGS. 1-5 and 6) can include some or all of the features described with reference to FIG. 7.

An example artificial intelligence-based autonomous continuous testing platform 702 system includes a configuration extraction engine 704. In a specific implementation, the configuration extraction engine 704 hooks into configurations that have been done in any SAP, Oracle, Salesforce, and/or custom instance. The configuration hook can ensure that a base configuration can be read through an external API (or other type of interface) and can be triggered appropriately.

The artificial intelligence-based autonomous continuous testing platform 702 includes a model-based test analysis engine 706. In a specific implementation, based on a customer's base configuration (e.g., a base configuration of a remote system) and leveraging deep machine learning, the model-based test analytics engine 706 comprises a plugin that creates a most viable configuration model (or MVCM or custom configuration model). The model-based test analysis engine 704 can use a continuously evolving log repository that has been created based on deep SAP, Oracle, and Salesforce expertise working with many different global customers (e.g., hundred, thousands, etc.). In a specific implementation, the model-based test analytics engine 706 can be considered as a machine understandable (e.g., API quarriable) version of normalized customers configuration (or, base configuration).

The artificial intelligence-based autonomous continuous testing platform 702 incudes a user journey analysis engine 710. In a specific implementation, the model-based test analytics engine 706, and/or the output thereof, is passed to the user journey analysis engine 710 which can generate relevant user journeys (LUJs) that need to be, and/or can be, tested autonomously. In a specific implementation, these tests are autonomously pre-configured at run-time using the configuration set up details of Forms/layouts/custom code.

This artificial intelligence-based autonomous continuous testing platform 702, and/or the component(s) thereof, can help save 70% of test creation time for users, thereby helping them to test early and test often.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

What is claimed is:

1. A system comprising:
one or more processors; and
memory storing instructions that, when executed by the one or more processors, cause the system to perform:
obtaining a configuration hook;
obtaining, from a remote system over a communication network, a base configuration of the remote system using the configuration hook;
obtaining a system-specific model associated with the configuration hook and the remote system, the system-specific model being specific to the remote system;
obtaining one or more pre-built test accelerators from a local library of pre-built test accelerators;
obtaining a deep machine learning model from a local library of machine learning models, the local library of machine learning models including a plurality of different types of machine learning models;
generating, based on the base configuration obtained using the configuration hook, the system-specific model associated with the configuration hook and the remote system, the one or more pre-built test accelerators obtained from the local library of pre-built test accelerators, and the deep machine learning model obtained from the local library of machine learning models including a plurality of different types of machine learning models, a custom configuration model;
generating, based on the custom configuration model, a plurality of user journeys to be autonomously tested;
generating, based on the custom configuration model and the plurality of user journeys to be autonomously tested, a plurality of autonomous test scripts;
autonomously pre-configuring at run-time the plurality of autonomous test scripts;
autonomously executing, in response to pre-configuring at run-time the plurality of autonomous test scripts, the plurality of autonomous test scripts;
generating, based on the autonomously executed plurality of autonomous test scripts, one or more autonomous test reports;
presenting, in response to generating the one or more autonomous test reports based on the autonomously executed plurality of autonomous test scripts, the one or more autonomous test reports.

2. The system of claim 1, wherein the configuration hook comprises an application programming interface (API) and artificial intelligence to obtain the base configuration of the remote system.

3. The system of claim 2, wherein the instructions further cause the system to perform:
identifying, based on the API and the artificial intelligence of the configuration hook, configuration information of the remote system;
selecting, based on the API and the artificial intelligence of the configuration hook, a subset of the configuration information of the remote system;
extracting, based on the API and the artificial intelligence of the configuration hook, the subset of the configuration information of the remote system, wherein the subset of the configuration information comprises the base configuration of the remote system;
locally storing the subset of the configuration information as the base configuration.

4. The system of claim 3, wherein the configuration hook is generated based on a template configuration hook.

5. The system of claim 4, wherein the instructions further cause the system to perform generating the configuration hook based on the template configuration hook and the system-specific model.

6. The system of claim 1, wherein the system-specific model is selected from a plurality of different system-specific models.

7. The system of claim 6, wherein the custom configuration model comprises a retrofit of the system-specific model by the deep machine learning model using the base configuration.

8. The system of claim 1, wherein the user journeys comprise any of walkthroughs, source code, machine code, image data, video data, and audio data.

9. The system of claim 1, wherein the plurality of autonomous test scripts are executed by an autonomous test execution agent.

10. The system of claim 9, wherein the autonomous test execution agent generates the one or more autonomous test reports.

11. A method implemented by a computing system including one or more processors and storage media storing machine-readable instructions, wherein the method is performed using the one or more processors, the method comprising:
obtaining a configuration hook;
obtaining, from a remote system over a communication network, a base configuration of the remote system using the configuration hook;

obtaining a system-specific model associated with the configuration hook and the remote system, the system-specific model being specific to the remote system;

obtaining one or more pre-built test accelerators from a local library of pre-built test accelerators;

obtaining a deep machine learning model from a local library of machine learning models, the local library of machine learning models including a plurality of different types of machine learning models;

generating, based on the base configuration obtained using the configuration hook, the system-specific model associated with the configuration hook and the remote system, the one or more pre-built test accelerators obtained from the local library of pre-built test accelerators, and the deep machine learning model obtained from the local library of machine learning models including a plurality of different types of machine learning models, a custom configuration model;

generating, based on the custom configuration model, a plurality of user journeys to be autonomously tested;

generating, based on the custom configuration model and the plurality of user journeys to be autonomously tested, a plurality of autonomous test scripts;

autonomously pre-configuring at run-time the plurality of autonomous test scripts;

autonomously executing, in response to pre-configuring at run-time the plurality of autonomous test scripts, the plurality of autonomous test scripts;

generating, based on the autonomously executed plurality of autonomous test scripts, one or more autonomous test reports;

presenting, in response to generating the one or more autonomous test reports based on the autonomously executed plurality of autonomous test scripts, the one or more autonomous test reports.

12. The method of claim 11, wherein the configuration hook comprises an application programming interface (API) and artificial intelligence to obtain the base configuration of the remote system.

13. The method of claim 12, further comprising:

identifying, based on the API and the artificial intelligence of the configuration hook, configuration information of the remote system;

selecting, based on the API and the artificial intelligence of the configuration hook, a subset of the configuration information of the remote system;

extracting, based on the API and the artificial intelligence of the configuration hook, the subset of the configuration information of the remote system, wherein the subset of the configuration information comprises the base configuration of the remote system;

locally storing the subset of the configuration information as the base configuration.

14. The method of claim 13, wherein the configuration hook is generated based on a template configuration hook.

15. The method of claim 14, further comprising generating the configuration hook based on the template configuration hook and the system-specific model.

16. The method of claim 11, wherein the system-specific model is selected from a plurality of different system-specific models.

17. The method of claim 16, wherein the custom configuration model comprises a retrofit of the system-specific model by the deep machine learning model using the base configuration.

18. The method of claim 11, wherein the user journeys comprise any of walkthroughs, source code, machine code, image data, video data, and audio data.

19. The method of claim 11, wherein the plurality of autonomous test scripts are executed by an autonomous test execution agent.

20. The method of claim 19, wherein the autonomous test execution agent generates the one or more autonomous test reports.

* * * * *